United States Patent
Cabouli

(10) Patent No.: US 10,492,012 B2
(45) Date of Patent: Nov. 26, 2019

(54) WIRELESS VEHICLE/DRONE ALERT AND PUBLIC ANNOUNCEMENT SYSTEM

(71) Applicant: Steven D. Cabouli, San Diego, CA (US)

(72) Inventor: Steven D. Cabouli, San Diego, CA (US)

(*) Notice: Subject to any disclaimer, the term of this patent is extended or adjusted under 35 U.S.C. 154(b) by 0 days.

(21) Appl. No.: 15/807,302

(22) Filed: Nov. 8, 2017

(65) Prior Publication Data

US 2019/0141463 A1    May 9, 2019

(51) Int. Cl.
| | |
|---|---|
| *H04R 27/00* | (2006.01) |
| *B64C 39/02* | (2006.01) |
| *H04W 4/04* | (2009.01) |
| *H04W 4/40* | (2018.01) |
| *H04W 4/90* | (2018.01) |
| *H04W 4/80* | (2018.01) |

(52) U.S. Cl.
CPC .......... *H04R 27/00* (2013.01); *B64C 39/024* (2013.01); *H04W 4/04* (2013.01); *H04W 4/40* (2018.02); *B64C 2201/12* (2013.01); *H04R 2420/07* (2013.01); *H04R 2499/13* (2013.01); *H04W 4/80* (2018.02); *H04W 4/90* (2018.02)

(58) Field of Classification Search
CPC ............ B64C 2201/208; B64C 39/024; B64C 2201/12; B64C 2201/122; B64C 39/02; G06F 3/167; H04R 27/00; H04R 27/04; H04R 2227/00; H04R 2499/13
See application file for complete search history.

(56) References Cited

U.S. PATENT DOCUMENTS

| | | | |
|---|---|---|---|
| 5,043,646 A * | 8/1991 | Smith | G05D 1/0033 318/16 |
| 5,371,802 A * | 12/1994 | McDonald | G10K 15/02 381/110 |
| 9,471,059 B1 * | 10/2016 | Wilkins | G05D 1/0016 |
| 9,704,409 B2 * | 7/2017 | Prakash | B64C 39/024 |
| 2013/0018834 A1 * | 1/2013 | Dal Lin Junior | H04R 5/04 706/46 |

* cited by examiner

*Primary Examiner* — Kile O Blair
(74) *Attorney, Agent, or Firm* — Richard D. Clarke

(57) ABSTRACT

The present invention is directed to Wireless Vehicle/Drone Alert and Public Announcement System that creates a means for an individual to communicate with people outside their vehicle along with being able to emit preprogrammed sounds from the front, back or sides by using directional buttons, or a four or eight position directional controlling joystick, to make people aware of their presence or intentions. Additionally, a user with a smartphone, using a preprogrammed mobile smartphone application (APP) in the vehicle, has the ability to direct and activate the vehicle engine compartment module or a drone activation module to make customizable audio message transmissions. Drones can be deployed on streets, into houses, stores, buildings and around public places to alert people there of dangerous conditions.

20 Claims, 2 Drawing Sheets

WIRELESS VEHICLE/DRONE ALERT AND PUBLIC ANNOUNCEMENT SYSTEM

FIELD OF THE INVENTION

This application provides a means for an individual to communicate with people outside their vehicle along with being able to emit an audio from the front, back or sides to make people aware of the intention of the driver's presence or intensions. In addition, the individual in the vehicle can control and make announcements with their smartphone to a remote drone.

BACKGROUND OF THE INVENTION

All of us have experienced a vehicle in front of us whereas the driver might be texting, looking at his/her emails, talking on the phone or any other distraction whereas he/she is oblivious to the fact that the traffic light has turned green and holding up the traffic behind them. Honking the vehicle's horn can be interpreted by that driver as rude, irritating and in many instances, can lead to road rage whereas there could be offensive verbal exchanges between the two drivers, often leading to physical harm and even death.

A study conducted by an independent firm has concluded that adding those few seconds lost due to distraction cost the country thousands of lost hours of work, missed appointments and the cost of fuel are in the millions of dollars due to vehicles idling while the distracted driver is not paying attention to the traffic signals.

When backing out of a parking place in a parking lot with a large vehicle next to you, it is impossible to see another car or person approaching from that side. Large trucks have an automatic beeping sound when they are backing but private vehicles don't presently have that capability.

An example of the prerecorded sounds from a mobile application (APP) programmed into the cell phone or smartphone that may be recorded on the Wireless Vehicle/Drone Alert and Public Announcement System can be a variety of different automotive beep, beeps or a verbal announcement such as "I am backing up" or "my car is coming up beside your bicycle" as you approach the rider or "would you please move on through the green light." A public announcement (PA) system is also convenient for emergency situations, messages and advertising announcements.

Since electric cars do not emit any engine sound, there are many accidents that occur since people cannot hear them when they back up at a parking lot or while making a turn at an intersection. By using a joystick, similar to those used in heavy equipment, four or eight elements with a pressure down to activate or deactivate can be used without the driver taking his/her eyes off the road. As an example, an engine sound revving up or a constant beep through the PA system in the front or rear can avoid accidents from fender benders to fatal pedestrian injuries.

Numerous innovations have been provided in the prior art that are described as follows. Even though these innovations may be suitable for the specific individual purposes to which they address, they differ from the present Wireless Vehicle/Drone Alert and Public Announcement System as hereinafter contrasted. The following is a summary of those prior art patents most relevant to the system at hand, as well as a description outlining the difference between the features of the present design and those of the prior art.

U.S. Pat. No. 5,113,175 of Robert Adel describes a motor vehicle bright light dimming signal from the back window and control system for alerting a driver of a vehicle behind a signaling vehicle to dim his bright lights. The signal system comprises one or more flashing lights mounted on the rear package tray of the vehicle.

This patent describes a lighted warning system from the back window of a vehicle but does not involve the usage of a smartphone as an option to the control module in the vehicle to produce prerecorded sounds from the back, front and sides of a vehicle as well as controlling the operations of a drone.

U.S. Pat. No. 7,812,740 B2 John-Francis Mergen describes devices, and methods for alerting pedestrians as to the presence of a vehicle are provided. The system for providing alert tones may include a personal communication device, such as a mobile terminal, a vehicle communication system, and an output device. A driver of a vehicle equipped with a vehicle communication system may select an alert tone to download to his vehicle directly using the vehicle communication system or indirectly via a communications link between the personal communication device and the vehicle communication system. Upon approaching a pedestrian, the driver may actuate the vehicle communication system to sound the alert tone through the output device by interacting with an input device, such as a button or a switch. Actuation may also be caused by a voice command or automatically, through the detection of an object within a certain distance of the vehicle via one or more sensors.

This patent describes devices, and methods for alerting pedestrians as to the presence of a vehicle. This patent deals primarily with people or objects in around the vehicle but does not deal with objects or bicycles or other objects to the sides of the vehicle. It does not facilitate the use of a smartphone for audio transmissions from a unique prerecorded APP or the use of a drone for the processes involved including photography. Motion sensors do not pickup individuals or vehicles in a parking lot when you have parked next to a large vehicle when a person or vehicle is moving from that side. Their patent would most likely not require a special license due to its simplicity and would not be useful to the police departments.

U.S. Pat. No. 7,952,489 B1 of Greg Paterno describes a vehicle communication system. The system includes a display installed in, or on, a first vehicle such that the display is viewable by persons in other vehicles or pedestrians proximate the first vehicle. The display is communicatively linked to one or more vehicle systems or a vehicle controller area network whereby based on activation, engagement or utilization of a vehicle system, the display automatically displays a message associated with the activation, engagement or activation of the vehicle system. For example, if a driver of the vehicle applies the brakes, a "STOPPING" message is displayed. Messages may be preprogrammed into the system or custom created and entered by a user. The display may also be used to advertise, alert passersby to an emergency or otherwise communicate with persons in other vehicles or pedestrians.

This patent describes a vehicle communication system. The system includes a display installed in, or on, a first vehicle such that the display is viewable by persons in other vehicles or pedestrians proximate the first vehicle. This patent does not deal with the safety of people beside or behind the vehicle. It does not make use of a smartphone or a drone to accomplish the tasks described.

U.S. Pat. No. 7,378,948 B2 of Eddie Somuah describes a digital message display for vehicles detects a tailgater and automatically flashes a warning message, directed to the tailgater, on a message display that is located in the rear window of the vehicle in view of following traffic. In addition to the warning message directed to the tailgater, a distance display is located in view of the vehicle driver to indicate the distance of the tailgater. An audible alarm alerts the driver to the presence of the tailgater. Additionally, a wireless remote-control device allows the driver to manually select and display one of a number of pre-defined safety and courtesy messages. Multiple distance sensors provide multiple functional ranges to accommodate varying driving or traffic conditions.

This patent describes a message display for vehicles detects a tailgater and automatically flashes a warning message, directed to the tailgater, on a message display that is located in the rear window of the vehicle in view of following traffic. This patent does not deal with the safety of people beside or behind the vehicle. It does not make use of a smartphone or a drone to accomplish the tasks described.

SUMMARY OF THE INVENTION

The principle advantage of the Wireless Vehicle/Drone Alert and Public Announcement System is having a means for an individual to communicate with people outside their vehicle.

Another advantage of the Wireless Vehicle/Drone Alert and Public Announcement System is having a means for an individual in a vehicle to be able to emit a sound from the front, back or sides to make people aware of their presence or intensions through the operation push buttons or of a four or eight position joystick through the PA system.

Another advantage of the Wireless Vehicle/Drone Alert and Public Announcement System is the sounds can be a variety of different automotive beep, beeps or prerecorded verbal announcements such as "I am backing up" or "my car is coming up beside you" as you approach a bicycle rider or "would you please move on through the green light."

Another advantage of the Wireless Vehicle/Drone Alert and Public Announcement System is the ability to use the smartphone as a microphone to make public announcements such as Amber Alerts and use APP's for prerecorded messages and sounds.

Another advantage of the Wireless Vehicle/Drone Alert and Public Announcement System is having an individual in a vehicle to be able to control a drone to make public announcements such as local neighborhood Amber Alerts.

Another advantage of this unique system it can be effectively used by police or fire departments or licensed for the use by private citizens. This may vary upon which state the system is operated in.

These together with other advantages of the Wireless Vehicle/Drone Alert and Public Announcement System, along with the various features of novelty, which characterize the design, are pointed out with particularity in the claims annexed to and forming a part of this disclosure. For a better understanding of the Wireless Vehicle/Drone Alert and Public Announcement System, its operating advantages and the specific objects attained by its uses, reference should be made to the accompanying drawings and descriptive matter in which there are illustrated preferred embodiments of this application.

The Wireless Vehicle/Drone Alert and Public Announcement System creates a means for an individual to communicate with people outside their vehicle along with being able to emit a sound from the front, back or sides to make people aware of their presence or intensions. The operations may be controlled by the means of an APP on the smartphone or a four or eight position joystick through the public-address system in the vehicle or the drone. To operate the joystick, it is spring loaded up for the primary four positions and requires pressure down to operate the secondary four positions. The joystick operation does not require the operator to look down while driving giving a wide variety of operations. In addition, this system has the capability to communicate with a remote-controlled drone having some of the same features. Furthermore, verbal commands can be issued by the operator using a smartphone to control the Wireless Vehicle/Drone Alert and Public Announcement System, since current smartphones/tablets have integrated voice recognition firmware such as Siri, Alexa and Google.

This unique system can be effectively used by police or fire departments or licensed for the use by private citizens. This may vary upon which state the system is operated in.

The Wireless Vehicle/Drone Alert and Public Announcement System solves these problems by emitting a pleasant "wake up call" to the driver at a stoplight whereas the Wireless Vehicle/Drone Alert and Public Announcement System comprises of a speaker with an amplifier in the engine compartment module. It is fastened with hook-loop material, zip ties or screws. The speaker is powered by an integrated lithium-ion battery that is charged through a micro USB port. Through this port you can also download through an APP on your smartphone hundreds of prerecorded sounds such as horn-like sounds and announcements like "Amber Alerts". Also, you can advertise through the PA "Mr. Anderson, your Uber ride is here" at a crowded area where several people are waiting for the same service with prerecorded messages.

The speakers in the vehicle or in the drone are activated wirelessly by either an APP on your smartphone or a control module inside the main cabin provided as a kit with speakers, front back and on the sides. It also has a lithium-ion battery and a micro USB port for charging. The control module is comprised of one or more buttons or a joystick that will command the speaker inside the engine compartment module to emit the programmed sounds. By having more than one button, the driver can choose which sound is best suited for that particular moment. The control panel has LED lights to notify the user when the ion-lithium battery is low on charge for the speaker, the control module, or both. The control unit may resemble a bottle in order to harness the battery and the wireless module where it can be placed in a cup holder nearby the driver. Other versions of the control module with only one button for pressing to produce the sound or a multi-position joystick can be affixed by means of a hook-loop material on the center console, armrest or any other place where the driver desires to do so. In addition to the lithium-ion battery, the unit may be powered by a direct connection to the vehicles primary battery or another on board vehicle battery.

Furthermore, verbal commands can be issued by the operator using a smartphone or tablet to control the Wireless Vehicle/Drone Alert and Public Announcement System, since current smartphones and tablets have integrated voice recognition firmware such as Siri, Alexa and Google. In addition, the Wireless Vehicle/Drone Alert and Public Announcement System has the capability of having the drone carried PA system operating to patrol halls inside buildings alerting people that there is an emergency such as a fire or active shooter, terrorist attack or the like. Internal PA system drones can be immediately deployed to problem areas within a building it is patrolling where and when it would take humans longer to reach and more dangerous to proceed.

The system is comprised of two primary components and two optional components:

1. An engine compartment module enclosed in a heat resistant case with amplifier that adheres to the engine compartment by Velcro, zip ties or screws consisting of:
   a) Speaker
   b) Bluetooth and/or long range wireless radio frequency
   c) Lithium-Ion battery and/or direct wired connection to the vehicle battery
   d) Micro-USB port for charging the engine compartment module battery 2. A mobile smartphone application (APP) to download to your smartphone whereas the APP consists of either a voice recognition and voice command system or a menu system and buttons to tap for:
   a) Different horn sounds (Model-T Ford, sports car, truck, etc.).
   b) Emergency Public Announcements: ("Help!" played continuously, "I need a doctor!", "Please get help!", "I am injured!", etc.)
   c) Advertising/messaging announcements: "Roto Rooter is here", "Pizza Hut delivery", etc.
   d) A pass-through mode to play streaming radio to unit while "tailgating",
   e) Listen to news, sports or music broadcasts outside car while parked.
   f) Alarm mode to unit. Simple motion detection to trigger an alert or warning message to "stay away". Alarm mode activated from smartphone APP.
   g) Personalized pre-recorded PA messages
   h) Low battery indicator light for amplifier
   i) A safety warning to bicycle riders as you pass.
   j) Announcements—for ride share arrival announcement. "Uber for Cabouli," "Lyft for Clarke," etc.

3. An optional in-vehicle control unit that can be installed inside the vehicle within the driver's reach that has:
   a) 1-3 buttons
   b) a 4 or 8 position joystick
   c) Bluetooth and/or long range wireless radio frequency
   d) Lithium-Ion battery and/or direct wired connection to the vehicle battery.

4. An optional drone mountable activation module control unit having a speaker, that can be installed mounted on a drone, where a drone is configured with custom clamps to securely hold in place the drone mountable activation module control unit equipped with a speaker. Optionally, the same engine compartment module described in 1. above can be installed on a specific drone with custom clamps to securely hold in place the engine compartment module. The drone activation module would include:
   a) a Speaker
   b) Bluetooth and/or long range wireless radio frequency capabilities
   c) lithium-ion battery Additionally, it is anticipated that the aforementioned four components can be sold as a kit in any combination, and the engine compartment module could also be used as a drone activation module when included with the appropriate mounting hardware. The basic kit would include an engine compartment module and smartphone mobile application (APP). A deluxe kit would include all four components, or alternatively, include three components when the engine compartment module is used as a drone mountable activation module control unit, as this double use component can be used either installed in the engine compartment of a vehicle or attached to a drone.

There has thus been outlined, rather broadly the more important features of the Wireless Vehicle/Drone Alert and Public Announcement System in order that the detailed description thereof that follows may be better understood and in order that the present contribution to the art may be better appreciated. There are other additional features of the application that will be described hereinafter, and which will form the subject matter of the claims appended hereto.

BRIEF DESCRIPTION OF THE DRAWINGS

The accompanying drawings, which are incorporated in and form a part of this specification, illustrate embodiments of the Wireless Vehicle/Drone Alert and Public Announcement System and together with the description, serve to explain the principles of this design.

The accompanying drawings, which are incorporated in and form a part of this application, illustrate embodiments of the Wireless Vehicle/Drone Alert and Public Announcement System and together with the description, serve to explain the principles of this system design.

DETAILED DESCRIPTION OF THE PREFERRED EMBODIMENTS

As required, detailed embodiments of the present Wireless Vehicle/Drone Alert and Public Announcement System are disclosed herein, however, it is to be understood that the disclosed embodiments are merely exemplary of the Wireless Vehicle/Drone Alert and Public Announcement System that may be embodied in various forms. Therefore, specific functional and structural details disclosed herein are not to be interpreted as limiting, but merely as basic for the claims and as a representative basis for teaching one skilled in the art to variously employ the present Wireless Vehicle/Drone Alert and Public Announcement System in virtually any appropriately detailed structure.

Figure 1:
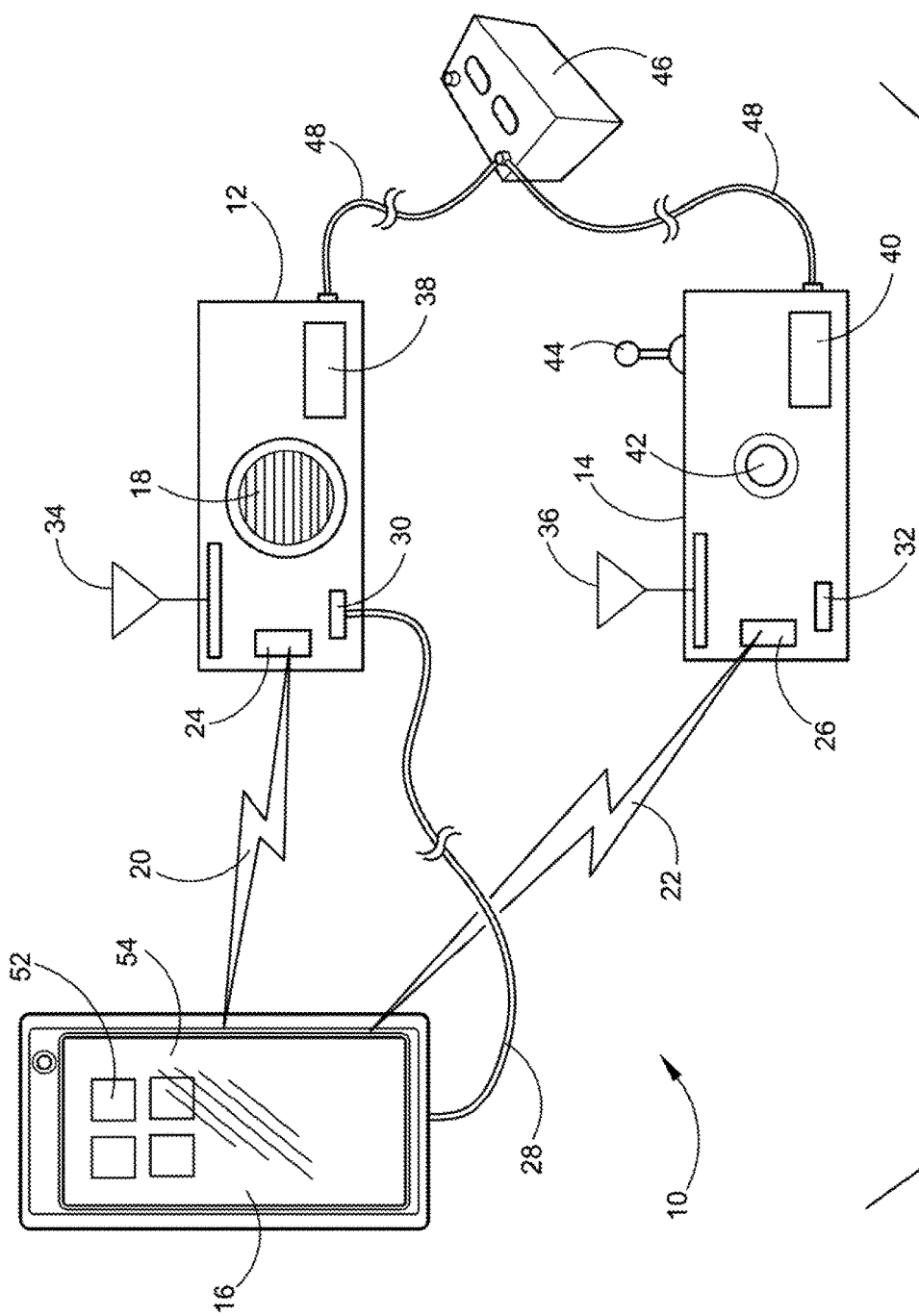
FIG. 1 depicts a diagram of the primary components of the Wireless Vehicle/Drone Alert and Public Announcement System, illustrating the engine compartment module and the control module in direct communication with a smartphone.

Referring now to the drawings, wherein similar parts of the Wireless Vehicle/Drone Alert and Public Announcement System 10 are identified by like reference numerals, there is seen in FIG. 1 a diagram of the primary components of the Wireless Vehicle/Drone Alert and Public Announcement System 10 where the smartphone 16 may communicate with the engine compartment module 12 and the in-vehicle control module 14 by the means of the Bluetooth and/or long range wireless radio frequency wireless communication links 20 and 22 to the wireless nodules 24 and 26. A speaker 18 located on the engine compartment module 12 is used to emanate audio sounds, such as public announcements and other verbal messages and alert sounds from the engine compartment module 12 of the Wireless Vehicle/Drone Alert and Public Announcement System 10 to the outside environment surrounding the vehicle.

A direct wire connection may additionally be made via a USB cable 28 from the smartphone 16 to the USB ports 30 and 32 in the engine compartment module 12 or the in-vehicle control module 14. Additionally, either the engine compartment module 12 or the control module 14 can be directly wired to the vehicle primary battery 46 using a power cable 48, or other on-board battery for supplying power to the engine compartment module 12 or the in-vehicle control module 14.

Engine compartment module 12 and the in-vehicle control module 14 are equipped with Bluetooth and/or long range wireless radio frequency antennas 34 and 36 along with lithium-ion batteries 38 and 40. The in-vehicle control module 14 may be equipped with one or more preprogrammed control buttons 42 and a preprogrammed four or eight position joystick 44. In addition to the lithium-ion battery, either unit may be powered by a direct connection to the vehicles primary battery 46 or another on board vehicle battery, via electrical wires such as a direct connection power cord or, as shown here in FIG. 1, power cable 48.

Figure 2:
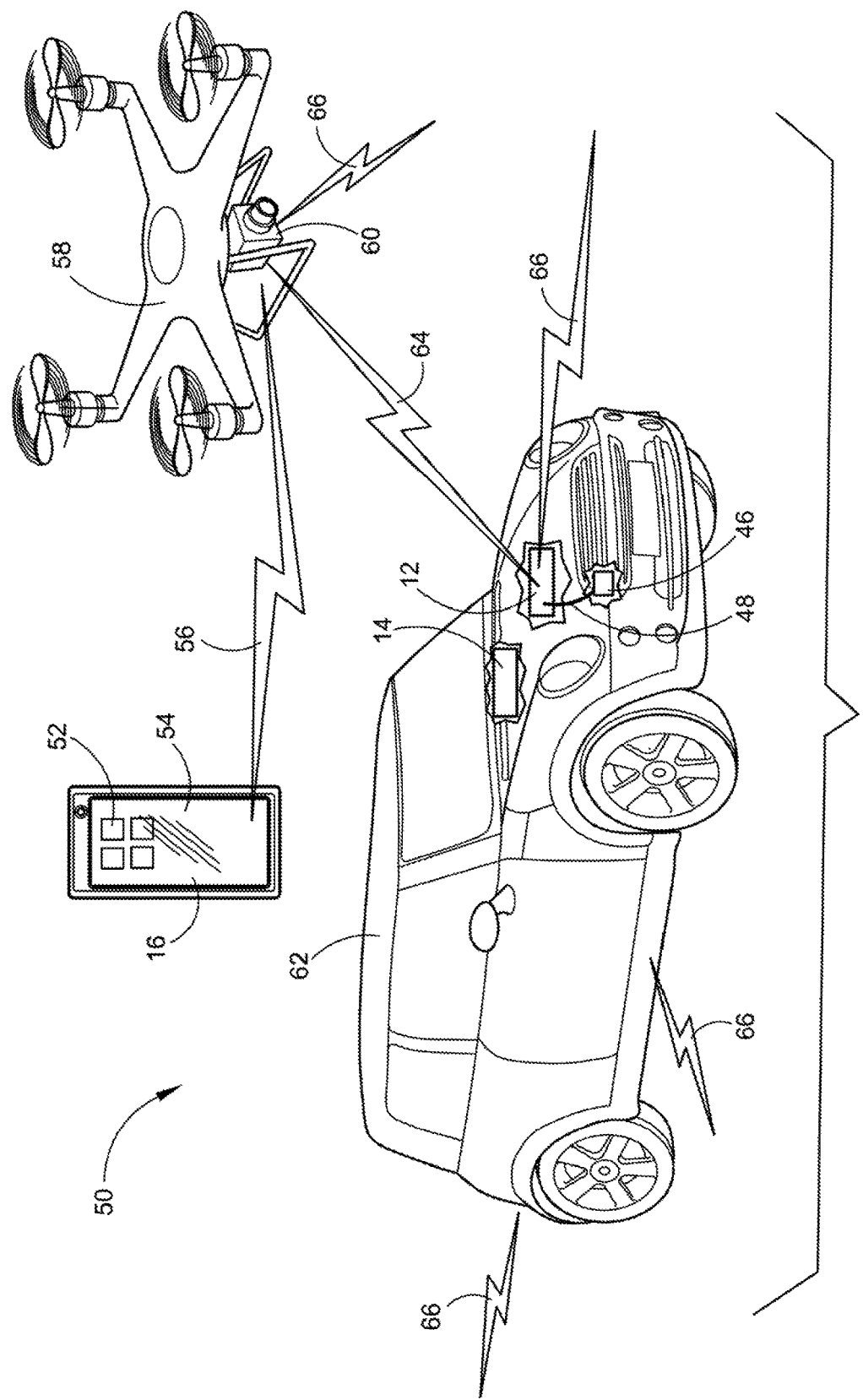
FIG. 2 depicts a diagram of the secondary components of the Wireless Vehicle/Drone Alert and Public Announcement System, illustrating the engine compartment module and the control module in direct communication with a smartphone and a drone.

FIG. 2 depicts a diagram of the secondary components 50 of the Wireless Vehicle/Drone Alert and Public Announcement System 10 consisting of the smartphone 16 with buttons 52 provided by the means of a preprogrammed smartphone mobile application (APP) 54 to control and make announcements using the communication link 56 to the drone 58. The drone activation module 60 with speaker, is attached to the drone 58 to communicate either with the smartphone 16 or the engine compartment module 12 in the vehicle 62 by the means of the communication link 64. Communications may be accomplished through Bluetooth connections for short range, as within the vehicle 62, or via long range wireless radio frequencies, as for long range drone 58 and drone activation module 60 communications. This enables public announcements and other verbal messages and alert sounds to be broadcast to the outside environment surrounding the vehicle via the drone activation module 60 speaker for long range broadcasting away from the vehicle vicinity, or the speaker 18 located on the engine compartment module 12 for shorter range broadcasts in the near vicinity of the vehicle.

The vehicle can make audio transmissions 66 by the means of the engine compartment module 12. The drone 58 can also make audio transmissions 66 in proximity to the vehicle, the smartphone, or within a building or structure as needed. The drone 58 and drone activation module 60 with speaker carried Wireless Vehicle/Drone Alert PA system 10 can operate to patrol halls inside buildings, in public places such as indoor or outdoor shopping malls and school campuses, for example, making public announcements and other verbal messages and alert sounds alerting people that there is an emergency such as a fire, approaching storm or tornado, or active shooter, or terrorist attack or the like. Internal PA system drones 58 equipped with drone activation modules 60 with speakers capable of making audio transmissions 66, can be immediately deployed to problem areas within a building it is patrolling where and when it would take humans longer to reach and where it would be much more dangerous for humans to patrol or proceed. Again, in addition to the lithium-ion battery, the engine compartment module 12 may be powered by a direct connection to the vehicles primary battery 46 or another on board vehicle battery, via electrical wires such as a direct connection power cord or, as shown here in FIG. 2, power cable 48. Additionally, drones 58 equipped with speakers can travel down highways and streets away from the immediate vicinity of the vehicle alerting other drivers of an emergency situation or traffic alerts.

The system comprises three primary components: (1) an engine compartment module enclosed in a heat resistant case with an amplifier that adheres to the engine compartment by Velcro, zip ties or screws, wherein the engine compartment module includes a speaker, Bluetooth and/or long range wireless radio frequency communications components, lithium-ion battery and/or direct wired connection to the vehicle battery, and a micro-USB port for charging the engine compartment module on-board lithium-ion battery; and (2) a mobile smartphone application (APP) to download to your smartphone which wirelessly connects to the engine compartment control module, and whereas the APP consists of either a voice recognition and voice command system or a menu system and buttons to tap for: different horn sounds (Model-T Ford, sports car, truck, etc.); emergency public announcements: ("Help!" played continuously. "I need a doctor!," "Please get help!," "I am injured!," etc.); advertising/messaging announcements: "Roto Rooter is here", "Pizza Hut delivery", etc.; a pass-through mode to play streaming radio to unit while "tailgating;" to listen to news, sports or music broadcasts outside car while parked; an alarm mode to unit consisting of a simple motion detection to trigger an alert or warning message to "stay away;" an alarm mode activated from a smartphone mobile application (APP) designed to control the entire system; personalized pre-recorded PA messages; low battery indicator light for amplifier; a safety warning to bicycle riders as you pass; announcements—for ride share arrival announcement, such as "Uber for Cabouli," "Lyft for Clarke," etc.; and (3) an optional control unit that can be installed inside the vehicle within the driver's reach that has: 1 to 3 or more buttons; a 4 or 8 position joystick; a Bluetooth and/or long range wireless radio frequency communications capability; and a lithium-ion battery and/or direct wired connection to the vehicle battery for supplying power to the on-board vehicle system, and supplying power to a drone activation module with speaker for drone broadcasting of public announcements and other verbal messages and alert sounds to be broadcast to the outside environment surrounding the vehicle via the drone activation module 60 speaker for long range broadcasting away from the vehicle vicinity, and the speaker 18 located on the on-board vehicle system engine compartment module 12 for shorter range broadcasts in the near vicinity of the vehicle.

Finally, it is anticipated that the Wireless Vehicle/Drone Alert and Public Announcement System 10 could be sold as individual components or as a complete assembled kit, including the amp, the smartphone mobile application (APP), the control panel with a 4 or 8 position joystick, the engine compartment module with speaker, and optionally the drone activation module and drone, as well as being sold as a complete kit with all of the above without the drone, for those individuals who already own a drone for mounting the drone activation module provided with the assembled kit.

The Wireless Vehicle/Drone Alert and Public Announcement System 10 shown in the drawings and described in detail herein disclose arrangements of elements of particular construction and configuration for illustrating preferred embodiments of structure and method of operation of the present design. It is to be understood, however, that elements of different construction and configuration and other arrangements thereof, other than those illustrated and described may be employed for providing a Wireless Vehicle/Drone Alert and Public Announcement System 10 in accordance with the spirit of this design, and such changes, alternations and modifications as would occur to those skilled in the art are considered to be within the scope of this application as broadly defined in the appended claims.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the details of the application, which is measured by the claims, nor is it intended to be limiting as to the scope of this design in any way.

I claim:

1. A wireless vehicle/drone alert and public announcement system, comprising:
   (a) an engine compartment module housed within a heat resistant case including and amplifier, a speaker, an antenna, one or more wireless communications modules, a USB port and a battery;
   (b) a smartphone mobile application system including a voice recognition and voice command system, having wireless communications capabilities, a menu system and menu control buttons, in wireless communication with said engine compartment module; and
   (c) a deployable drone including a speaker, mounted on a drone mountable activation module, in communication with said one or more wireless communications modules located in said engine compartment module;
   wherein said smartphone mobile application, in wireless communication with said engine compartment module, and in communication with said deployable drone, controls audio transmissions, in the form of public announcements and alert sounds, emanating from said engine compartment module speaker and said deployable drone speaker, using voice commands and menu control buttons within said smartphone mobile application system.

2. The wireless vehicle/drone alert and public announcement system according to claim 1, further including an in-vehicle control module including an antenna, one or more wireless communications modules, a joystick, a control button, a USB port and a battery, wherein said in vehicle control module is in wireless communications with said smartphone mobile application, and thereby controls audio transmissions emanating from said engine compartment module.

3. The wireless vehicle/drone alert and public announcement system according to claim 2, wherein said in-vehicle wireless communications modules includes both Bluetooth and long-range radio frequency wireless communications capabilities.

4. The wireless vehicle/drone alert and public announcement system according to claim 2, wherein said in-vehicle module joystick includes an 8-position joystick.

5. The wireless vehicle/drone alert and public announcement system according to claim 2, wherein said engine compartment module and said in-vehicle control module are powered by a lithium-ion battery.

6. The wireless vehicle/drone alert and public announcement system according to claim 2, wherein said engine compartment module and said in-vehicle control module are powered by a direct wired connection to a vehicle on-board primary battery.

7. The wireless vehicle/drone alert and public announcement system according to claim 1, further including a drone mounted activation module having a speaker and wireless communications capabilities, wherein said deployable drone and said drone mounted activation module with speaker is in wireless communications with said smartphone mobile application and thereby controls audio transmissions emanating from said drone mounted activation module speaker.

8. The wireless vehicle/drone alert and public announcement system according to claim 7, wherein said wherein said deployable drone and said drone mounted activation module with speaker wireless communications capabilities includes both Bluetooth and long-range radio frequency wireless communications capabilities.

9. The wireless vehicle/drone alert and public announcement system according to claim 1, wherein said smartphone mobile application, is in wired communication with said engine compartment module, using said USB port and a USB cable, to control audio transmissions emanating from said engine compartment module using voice commands and menu control buttons.

10. The wireless vehicle/drone alert and public announcement system according to claim 1, wherein said system is provided as a complete assembled kit, including the engine compartment module with speaker and amplifier, the smartphone mobile application, an in-vehicle control panel with a 4 or 8 position joystick, and the drone mountable activation control module with speaker and deployable drone.

11. A method for making a wireless vehicle/drone alert and public announcement system, comprising the steps of:
    (a) providing an engine compartment module housed within a heat resistant case including and amplifier, a speaker, an antenna, one or more wireless communications modules, a USB port and a battery;
    (b) providing a smartphone mobile application system including a voice recognition and voice command system, having wireless communications capabilities, a menu system and menu control buttons, in wireless communication with said engine compartment module; and
    (c) providing a deployable drone including a speaker, mounted on a drone mountable activation module, in communication with said one or more wireless communications modules located in said engine compartment module;
    wherein said smartphone mobile application, in wireless communication with said engine compartment module, and in communication with said deployable drone, controls audio transmissions, in the form of public announcements and alert sounds, emanating from said engine compartment module speaker and said deployable drone speaker, using voice commands and menu control buttons within said smartphone mobile application system.

12. The method of making a wireless vehicle/drone alert and public announcement system according to claim 11, further including an in-vehicle control module including an antenna, one or more wireless communications modules, a joystick, a control button, a USB port and a battery, wherein said in vehicle control module is in wireless communications with said smartphone mobile application and thereby controls audio transmissions emanating from said engine compartment module.

13. The method of making a wireless vehicle/drone alert and public announcement system according to claim 12, wherein said in-vehicle wireless communications modules includes both Bluetooth and long-range radio frequency wireless communications capabilities.

14. The method of making a wireless vehicle/drone alert and public announcement system according to claim 12, wherein said in-vehicle module joystick includes an 8-position joystick.

15. The method of making a wireless vehicle/drone alert and public announcement system according to claim 12, wherein said engine compartment module and said in-vehicle control module are powered by a lithium-ion battery.

16. The method of making a wireless vehicle/drone alert and public announcement system according to claim 12, wherein said engine compartment module and said in-vehicle control module are powered by a direct wired connection to a vehicle on-board primary battery.

17. The method of making a wireless vehicle/drone alert and public announcement system according to claim 11, further including a drone mounted activation module having a speaker and wireless communications capabilities, wherein said deployable drone and said drone mounted activation module with speaker is in wireless communications with said smartphone mobile application and thereby controls audio transmissions emanating from said drone mounted activation module speaker.

18. The method of making a wireless vehicle/drone alert and public announcement system according to claim 17, wherein said deployable drone and said drone mounted activation module with speaker wireless communications capabilities includes both Bluetooth and long-range radio frequency wireless communications capabilities.

19. The method of making a wireless vehicle/drone alert and public announcement system according to claim 11, wherein said smartphone mobile application, is in wired communication with said engine compartment module, using said USB port and a USB cable, to control audio transmissions emanating from said engine compartment module using voice commands and menu control buttons.

20. The method of making a wireless vehicle/drone alert and public announcement system according to claim 11, wherein said system is provided as a complete assembled kit, including the engine compartment module with speaker and amplifier, the smartphone mobile application, an in-vehicle control panel with a 4 or 8 position joystick, and the drone mountable activation control module with speaker and deployable drone.

* * * * *